3,351,576
VINYL CHLORIDE POLYMERS STABILIZED WITH MIXTURES COMPRISING BARIUM AND CADMIUM SOAPS OF MONOESTERS OF DICARBOXYLIC ACIDS
Vincent Oakes, Eccleston, England, assignor to Pure Chemicals Limited, Liverpool, England, a British company
No Drawing. Filed Feb. 17, 1964, Ser. No. 345,093
Claims priority, application Great Britain, Feb. 22, 1963, 7,199/63
6 Claims. (Cl. 260—23)

This invention relates to the stabilisation of vinyl resins, including vinyl chloride polymers and copolymers, and has for its object to provide a means whereby excellent heat stabilisation can be obtained, and at the same time the resin compositions acquire properties which enable fabrication to be carried out more readily.

According to the invention, vinyl resins are stabilized by incorporation of barium and cadmium soaps of dicarboxylic acids or of monoesters of such acids.

Acids which are eminently suitable for use in this invention are phthalic, maleic, succinic, tetra and hexa hydrophthalic acids as these acids readily form monoesters from their anhydrides. However, other dibasic acids such as adipic, glutaric, sebacic and oxalic acids could also be used with equal effect. Similarly, the esters can be formed quite readily from a wide range of alcohols containing from say 1–20 carbon atoms; most of our results have been obtained with the 2-ethyl hexyl esters as 2-ethyl hexanol is a relatively cheap commercially available alcohol.

The desired soaps can be formed by a number of well known techniques such as direct neutralisation of the oxide or hydroxide of the metal with the acid or acid ester or by double decomposition between for example barium or cadmium chloride and the sodium salt of the acid ester. The method by which the soap is obtained is relatively unimportant and both neutral and basic soaps have proved to be suitable as stabilisers.

The soaps may be used either in their solid state or mixed with other ingredients such as phosphites, epoxides, zinc soaps etc. in suitable solvent systems. In practice, complex mixtures of the soaps of the invention with the other ingredients will probably be the most suitable form in which to use them as it has been shown that, as with simple carboxylate soaps, the stabilisation characteristics of the soaps can be enhanced by the presence of phosphites and epoxy oils.

As a further feature of the invention, excellent stabilisers are formed from mixtures of the soaps of dibasic acids and acid esters with soaps of aliphatic mono carboxylic acids, phenols or naphthenic acids. Thus the barium soap of acid esters can be formed (e.g. barium octyl maleate, barium 2-ethyl hexyl succinate, barium 2-ethyl hexyl phthalate, barium butyl maleate etc.) and mixed with a suitable cadmium soap (e.g. cadmium octoate, cadmium naphthenate, cadmium stearte, cadmium ricinoleate, cadmium laurate) and a suitable stabiliser will result. In general the ratios of barium metal to cadmium metal are maintained at either 2:1, 1:1, and 1:2 in order to obtain the most satisfactory effect. The stabilisation characteristics of such mixtures can be enhanced even further by the addition of phosphites and epoxides. Alternatively to the above, a cadmium soap can be formed from the acid ester (e.g. cadmium octyl maleate, cadmium butyl succinate, cadmium octyl phthalate) and mixed with a variety of barium soaps (e.g. barium laurate, barium octoate, barium alkyl phenates etc.) in order to form satisfactory stabilisers. Here again, the stabilisation properties can be further enhanced by the addition of phosphites and epoxides. In mixed soaps of this type the heat stabilisation characteristics are often excellent whilst the non-plateout properties are midway between those of simple carboxylate soaps and soaps which are wholly derived from acid esters.

Mixtures of barium and cadmium salts of aliphatic carboxylic acids are in common use today in a wide variety of applications and help to stabilise the P.V.C. through different fabrication techniques such as calendering, extruding etc. These compounds do, however, suffer from some drawbacks particularly in the field of calendering in that they are relatively insoluble in P.V.C. and therefore tend to exude frome the sheet during manufacture. This effect becomes more pronounced when inert fillers are present as the stabiliser tends to bring out the filler as it exudes and so forms a coating on the calender bowls. This effect is known as "plateout" and is a serious problem to the manufacture of calendering sheet as the coating when formed on the bowls imparts an irregular embossed pattern to the calendered sheet and thus impairs its finished appearance.

The stabilisers according to the invention have been demonstrated to have virtually no tendency whatsoever to plateout and at the same time they have similar and often better heat stabilisation characteristics as compared with the simple carboxylate soaps.

The plateout of certain stabilisers during the fabrication of P.V.C. sheet is a phenomenon encountered on a large scale plant and is difficult to reproduce accurately in the laboratory. However, in order to evaluate stabilisers for this property the following test may be used which has been found by comparative experiments on a large scale gives an accurate guide to the order of plateout of a range of stabilisers.

A P.V.C. premix is formed to the following formulation:

| | Grams |
|---|---|
| P.V.C. (Breon 112) | 200 |
| Dioctyl phthalate | 80 |
| Paraplex G62 | 10 |
| Calcium carbonate | 40 |
| Red pigment | 2.0 |
| Stabiliser | 4.0 |

This mix is then milled on rolls heated at 150° for a total of seven minutes; the first two minutes at 15/1000" setting followed by 5 minutes at 40/1000" setting. The hide is then sheeted off the mill and if the stabiliser has poor plateout properties then the mill rolls are covered with the red pigment. The degree of plateout is then assessed by milling a "cleaner batch" of P.V.C. on the same rolls when the degree of pigmentation of this second batch can be taken as a measure of the plateout properties of the stabiliser. The cleaner batch used has the following formulation:

| | Grams |
|---|---|
| P.V.C. (Breon 112) | 200 |
| Dioctyl phthalate | 94 |
| Ferroclere 1203 | 4 |
| Silene EF | 4 |
| Titanium dioxide | 1 |

When examining standard compounds such as cadmium octoate, cadmium laurate, barium stearate and mixtures such as barium cadmium laurate by this test the cleaner batch was always deep red in colour. On the other hand, when subjecting compounds of the invention to this test the cleaner batch had either no colour or was tinted a very pale pink.

The heat stabilities of the compounds are assessed by examining at 2 phr. in a plasticised P.V.C. formulation which has been sheeted from a laboratory mill at 50 thousandths of an inch and heated in an air circulating oven at 185° for 2 hours, during which time samples are withdrawn for visual examination at pre-set intervals. In all but one instance the heat stabilities were superior to that of the barium and cadmium salts of octoic acid, the only exception being the salts of phthalic acid and its esters. In these cases the heat stability was slightly inferior but as the plateout was excellent they may be judged on balance to be better stabilisers than the corresponding alkyl carboxylates.

The invention is illustrated by the following examples of suitable stabilising compositions:

Example 1

| | Parts |
|---|---|
| Barium butyl succinate | 2 |
| Cadmium butyl succinate | 1 |

Example 2

| | Parts |
|---|---|
| Barium butyl succinate | 2 |
| Cadmium butyl succinate | 1 |
| Bisphenol A | 0.1 |

Example 3

| | Parts |
|---|---|
| Barium butyl succinate | 2 |
| Cadmium butyl succinate | 1 |
| Bisphenol A | 0.1 |
| Triphenyl phosphite | 0.3 |

Example 4

| | Parts |
|---|---|
| Barium laurate | 2 |
| Cadmium octyl maleate | 1 |
| Bisphenol A | 0.1 |

Example 5

| | Parts |
|---|---|
| Barium maleate | 2 |
| Cadmium butyl maleate | 1 |

Example 6

| | Parts |
|---|---|
| Barium nonyl phenate | 2 |
| Cadmium butyl succinate | 1 |
| 2:6 Ditert butyl p-cresol | 0.1 |
| Triphenyl phosphite | 0.3 |

Example 7

| | Parts |
|---|---|
| Basic barium succinate | 2 |
| Cadmium octoate | 1 |
| Bisphenol A | 0.1 |

Example 8

| | Parts |
|---|---|
| Barium butyl succinate | 2 |
| Cadmium ricinoleate | 1 |
| 2:6 Ditert butyl p-cresol | 0.1 |

Example 9

| | Parts |
|---|---|
| Barium octyl maleate | 2 |
| Cadmium laurate | 1 |
| Bisphenol A | 0.1 |

Example 10

| | Parts |
|---|---|
| Barium octyl hexahydrophthalate | 2 |
| Cadmium octoate | 1 |
| 2:6 Ditert butyl p-cresol | 0.1 |

Example 11

| | Parts |
|---|---|
| Barium octyl hexahydrophthalate | 2 |
| Cadmium succinate | 1 |
| Bisphenol A | 0.1 |

Example 12

| | Parts |
|---|---|
| Barium butyl maleate | 2 |
| Cadmium octyl maleate | 1 |
| Bisphenol A | 0.1 |

The stabiliser combinations described in the above examples were evaluated for heat stability and plateout characteristics by the methods described previously, and compared with barium and cadmium soaps used alone and with a mixture of barium and cadmium laurates. The results are summarised in tabular form below. The heat stability tests were examined at 15 minutes intervals and the colour formation assessed on a scale of 1 to 8 where 1 is colourless and 8 is black. The plateout tests were similarly assessed on a scale of 1 to 6 where 1 is colourless and 6 is dark red.

| Stabiliser | Heat Stability (2 phr. of stabiliser) | | | | | | Plateout (4 phr. of stabiliser) |
|---|---|---|---|---|---|---|---|
| | 15 Mins. | 30 Mins. | 45 Mins. | 60 Mins. | 90 Mins. | 120 Mins. | |
| Barium laurate | 2 | 3 | 4 | 7 | 8 | 8 | 5 |
| Cadmium laurate | 1 | 2 | 8 | 8 | 8 | 8 | 4 |
| 2:1 Barium/cadmium laurate | 1 | 2 | 3 | 4 | 7 | 8 | 6 |
| Barium butyl succinate | 1 | 3 | 4 | 5 | 7 | 8 | 1 |
| Cadmium butyl succinate | 1 | 2 | 5 | 8 | 8 | 8 | 1 |
| Barium maleate | 1 | 2 | 3 | 4 | 5 | 7 | 1 |
| Cadmium maleate | 1 | 3 | 4 | 7 | 8 | 8 | 2 |
| Example 1 | 1 | 1 | 1 | 2 | 4 | 8 | 2 |
| Example 2 | 1 | 1 | 1 | 2 | 4 | 8 | 2 |
| Example 3 | 1 | 1 | 1 | 2 | 4 | 7 | 2 |
| Example 4 | 1 | 1 | 2 | 3 | 6 | 8 | 4 |
| Example 5 | 1 | 1 | 1 | 3 | 5 | 7 | 2 |
| Example 6 | 1 | 1 | 2 | 3 | 5 | 7 | 3 |
| Example 7 | 1 | 1 | 2 | 4 | 7 | 8 | 3 |
| Example 8 | 1 | 1 | 2 | 3 | 6 | 8 | 3 |
| Example 9 | 1 | 1 | 2 | 3 | 6 | 8 | 3 |
| Example 10 | 1 | 1 | 2 | 4 | 6 | 8 | 3 |
| Example 11 | 1 | 1 | 1 | 3 | 5 | 7 | 2 |
| Example 12 | 1 | 1 | 1 | 2 | 4 | 7 | 2 | the stabilising compositions according to the invention may be used in amounts of 1 part to 5 parts by weight per hundred parts of resin, these being the proportions commonly used for known types of stabilisers consisting of salts of cadmium and barium. It is established practice to use organic phosphites at up to one part per hundred, phenols at up to 0.5 part per hundred and epoxy resins at up to 5 parts per hundred of resins. When such compounds are incorporated in the stabilisers according to the invention they are added in such amounts that the above mentioned conventional proportions will not be exceeded.

What is claimed is:

1. A composition for stabilizing vinyl chloride homopolymer and copolymers comprising a barium soap, a cadmium soap and a phenol, one of said soaps being a soap derived from a monoester of a dicarboxylic acid and the other of said soaps being a soap derived from a compound selected from the group consisting of monoesters of dicarboxylic acids and aliphatic monocarboxylic acids.

2. A composition as claimed in claim 1, in which the ratio of barium metal to cadmium metal is from 2:1 to 1:2.

3. A composition as claimed in claim 1, in which at least one of the soaps is derived from a compound selected from the group consisting of monoesters of an acid selected from the group consisting of phthalic, maleic, succinic, tetrahydrophthalic, hexahydrophthalic, adipic, glutaric, sebacic and oxalic acids with alcohols containing from 1 to 20 carbon atoms.

4. A composition as claimed in claim 1, in which one of the soaps is derived from a substance selected from the group consisting of lauric, ictoic, stearic and ricinoleic acids.

5. A composition as defined in claim 1 further including a member selected from the group consisting of organic phosphites and epoxy resins.

6. A stabilised composition comprising a vinyl resin selected from the group consisting of vinyl chloride homopolymer and copolymers and an effective quantity of a stabiliser as claimed in claim 1.

References Cited
UNITED STATES PATENTS

| | | | |
|---|---|---|---|
| 2,564,646 | 8/1951 | Leistner et al. | 260—23 |
| 2,590,059 | 3/1952 | Winkler | 260—23 |
| 2,681,900 | 6/1954 | Holmes et al. | 260—45.75 |
| 2,795,570 | 6/1957 | Fuchs et al. | 260—45.75 |
| 2,997,454 | 8/1961 | Leistner et al. | 260—45.75 |
| 3,231,531 | 1/1966 | Buckley et al. | 260—23 X |

FOREIGN PATENTS

| | | |
|---|---|---|
| 841,890 | 7/1960 | Great Britain. |

DONALD E. CZAJA, *Primary Examiner.*

LEON J. BERCOVITZ, *Examiner.*

R. A. WHITE, *Assistant Examiner.*